United States Patent
Lee et al.

(10) Patent No.: US 11,843,424 B2
(45) Date of Patent: Dec. 12, 2023

(54) ELECTRONIC DEVICE FOR PERFORMING ANTENNA TUNING AND METHOD THEREFOR

(71) Applicant: Samsung Electronics Co., Ltd., Gyeonggi-do (KR)

(72) Inventors: Youngkwon Lee, Gyeonggi-do (KR); Hyungjoon Yu, Gyeonggi-do (KR); Songsub Cha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 437 days.

(21) Appl. No.: 17/271,277

(22) PCT Filed: Jul. 24, 2019

(86) PCT No.: PCT/KR2019/009135
§ 371 (c)(1),
(2) Date: Feb. 25, 2021

(87) PCT Pub. No.: WO2020/050495
PCT Pub. Date: Mar. 12, 2020

(65) Prior Publication Data
US 2021/0391926 A1 Dec. 16, 2021

(30) Foreign Application Priority Data
Sep. 4, 2018 (KR) .................. 10-2018-0105426

(51) Int. Cl.
*H04B 17/12* (2015.01)
*H04B 17/10* (2015.01)
(Continued)

(52) U.S. Cl.
CPC .............. *H04B 17/12* (2015.01); *H01Q 1/24* (2013.01); *H04B 17/103* (2015.01); *H04B 7/0413* (2013.01)

(58) Field of Classification Search
CPC .... H04B 17/12; H04B 17/103; H04B 7/0413; H04B 7/0689; H01Q 1/24
See application file for complete search history.

(56) References Cited

U.S. PATENT DOCUMENTS

| 2008/0252522 A1 | 10/2008 | Asbridge |
| 2008/0267056 A1* | 10/2008 | Aryanfar ................ H04B 17/17 455/67.11 |

(Continued)

FOREIGN PATENT DOCUMENTS

| KR | 10-2011-0133245 A | 12/2011 |
| KR | 10-2012-0028176 A | 3/2012 |

(Continued)

OTHER PUBLICATIONS

Decision to Grant dated Feb. 27, 2023.

*Primary Examiner* — Ayaz R Sheikh
*Assistant Examiner* — David Zhijun Sun
(74) *Attorney, Agent, or Firm* — Cha & Reiter, LLC

(57) ABSTRACT

According to various embodiments, an electronic device may comprise: a housing; a wireless communication circuit positioned inside the housing so as to transmit/receive at least one radio frequency (RF) signal; multiple antennas positioned inside the housing or configured as parts of the housing and electrically connected to the wireless communication circuit; at least one processor operably connected to the wireless communication circuit; and a memory operably connected to the at least one processor. The memory may store a lookup table comprising a first set of antenna modes regarding at least some of the multiple antennas and a second set of antenna modes regarding at least some of the multiple antennas. In addition, the memory may store instructions that, when executed, cause the processor to: cause the wireless communication circuit to transmit a signal in a first antenna mode included in the first set; cause the (Continued)

wireless communication circuit to receive a reflective wave of the transmitted signal; acquire a measurement value of the received reflective wave; confirm whether the measurement value is included within at least one designated range; confirm a second antenna mode corresponding to the acquired measurement value, among the antenna modes included in the second set, if it is confirmed that the measurement value is included in at least one designated value; and cause the wireless communication circuit to transmit the signal in the second antenna mode. Other various embodiments are possible.

14 Claims, 10 Drawing Sheets

(51) Int. Cl.
*H01Q 1/24* (2006.01)
*H04B 7/0413* (2017.01)

(56) References Cited

U.S. PATENT DOCUMENTS

| | | |
|---|---|---|
| 2009/0253385 A1 | 10/2009 | Dent et al. |
| 2012/0062431 A1 | 3/2012 | Tikka et al. |
| 2013/0052967 A1 | 2/2013 | Black et al. |
| 2013/0154897 A1 | 6/2013 | Sorensen et al. |
| 2014/0099991 A1 | 4/2014 | Cheng et al. |
| 2016/0365909 A1* | 12/2016 | Kim .................... H03F 3/195 |
| 2019/0268954 A1 | 8/2019 | Yu et al. |

FOREIGN PATENT DOCUMENTS

| | | |
|---|---|---|
| KR | 10-2014-0091757 A | 7/2014 |
| KR | 10-2016-0145449 A | 12/2016 |
| KR | 10-2019-0101818 A | 9/2019 |
| WO | 2014/036532 A1 | 3/2014 |

* cited by examiner

ELECTRONIC DEVICE FOR PERFORMING ANTENNA TUNING AND METHOD THEREFOR

CROSS-REFERENCE TO RELATED APPLICATION(S)

This application is a National Phase Entry of PCT International Application No. PCT/KR2019/009135, which was filed on Jul. 24, 2019 and claims priority to Korean Patent Application No. 10-2018-0105426, which was filed on Sep. 04, 2018 in the Korean Intellectual Property Office, the contents of which are incorporated herein by reference.

1. Field

Various embodiments relate to an electronic device for performing antenna tuning, based on a reflective wave of a transmission signal, and a method therefor.

2. Description of the Related Art

Frequency resources have become gradually scarce due to the widespread use of various wireless services, but users of wireless services still want high-quality services having the high throughput and low latency. Accordingly, a broadband wireless system in a high frequency band has been developed in order to provide a new wireless service (for example, a fifth generation (5G) cellular system).

Meanwhile, since performance of an antenna may be greatly affected by an external environment, tuning such as adjusting antenna parameters may be performed. When antenna tuning is performed, a method of performing tuning by receiving a reflective wave transmitted from a terminal and analyzing an impedance thereof may be used.

SUMMARY

Several events that affect performance of an antenna may be experimentally identified in advance, and adjustment values of antenna parameters for overcoming the events may be identified. Based on the description above, I/Q values of a reflective wave, which have errors due to several events, may be identified in advance, and accordingly, parameters for optimizing an antenna may be stored.

However, as an amount of change in the I/Q values becomes small at a high frequency, there may be a case where I/Q values of a reflective wave, which have errors due to several events, overlap each other, and in this case, it may be difficult to identify an event which has caused an error. For example, if an I/Q value of a reflective wave, which has an error caused by a user's antenna grip, and an I/Q value of a reflective wave, which has an error caused by an earjack connection, overlap each other, it may be difficult to identify whether the error is an error caused by the user's antenna grip or an error caused by the earjack connection. When the error is an error caused by the user's antenna grip, if tuning to a parameter value for optimizing an antenna in a case where an error is caused by an earjack is performed, performance of an antenna may become worse.

Various embodiments may provide an electronic device for maintaining high wireless signal quality by performing fine tuning for optimizing an antenna when it is possible to identify an event that has caused an error, and a method therefor.

According to various embodiments, an electronic device may include: a housing; a wireless communication circuit positioned inside the housing so as to transmit or receive at least one radio frequency (RF) signal; multiple antennas positioned inside the housing or configured as parts of the housing, and electrically connected to the wireless communication circuit; at least one processor operatively connected to the wireless communication circuit; and a memory operatively connected to the at least one processor. The memory may store a lookup table including a first set of antenna modes regarding at least some of the multiple antennas and a second set of antenna modes regarding at least some of the multiple antennas. In addition, the memory may store instructions that, when executed, cause the processor to: cause the wireless communication circuit to transmit a signal in a first antenna mode included in the first set; cause the wireless communication circuit to receive a reflective wave of the transmitted signal; acquire a measurement value of the received reflective wave so as to identify whether or not the measurement value is included within at least one designated range; identify a second antenna mode corresponding to the acquired measurement value, among the antenna modes included in the second set, if it is identified that the measurement value is included within at least one designated range; and cause the wireless communication circuit to transmit the signal in the second antenna mode.

According to various embodiments, an electronic device may include: a housing; a wireless communication circuit positioned inside the housing so as to transmit or receive at least one RF signal; multiple antennas positioned inside the housing or configured as parts of the housing, and electrically connected to the wireless communication circuit; at least one processor operatively connected to the wireless communication circuit; and a memory operatively connected to the at least one processor. The memory may store instructions that, when executed, cause the processor to: cause the wireless communication circuit to transmit a signal in a first antenna mode; cause the wireless communication circuit to receive a reflective wave of the transmitted signal; acquire a measurement value of the received reflective wave; and change or maintain the first antenna mode, based on the acquired measurement value.

According to various embodiments, an electronic device may include: a housing; a wireless communication circuit positioned inside the housing so as to transmit or receive at least one RF signal; multiple antennas positioned inside the housing or configured as parts of the housing, and electrically connected to the wireless communication circuit; at least one processor operatively connected to the wireless communication circuit; and a memory operatively connected to the at least one processor. The memory may store a lookup table including a first set of antenna modes regarding at least some of the multiple antennas and a second set of antenna modes regarding at least some of the multiple antennas. In addition, the memory may store instructions that, when executed, cause the processor to: cause the wireless communication circuit to transmit a signal in a first antenna mode included in the first set; identify whether or not an intensity of a signal received through a first antenna among the multiple antennas and an intensity of a signal received through a second antenna among the multiple antennas satisfy a designated condition; cause the wireless communication circuit to receive a reflective wave of the transmitted signal, if it is identified that the intensities of the signals satisfy the designated condition; acquire a measurement value of the received reflective wave so as to identify whether or not the measurement value is included within at least one designated range; identify a second antenna mode corresponding to the acquired measurement value, among the antenna modes included in the second set, if it is identified that the measurement value is included within at least one designated range; and cause the wireless communication circuit to transmit the signal in the second antenna mode.

Various embodiments may provide an electronic device which can maintain high wireless signal quality without a limitation of a frequency range through antenna tuning using a reflective wave, and a method thereof.

DETAILED DESCRIPTION

Figure 1:
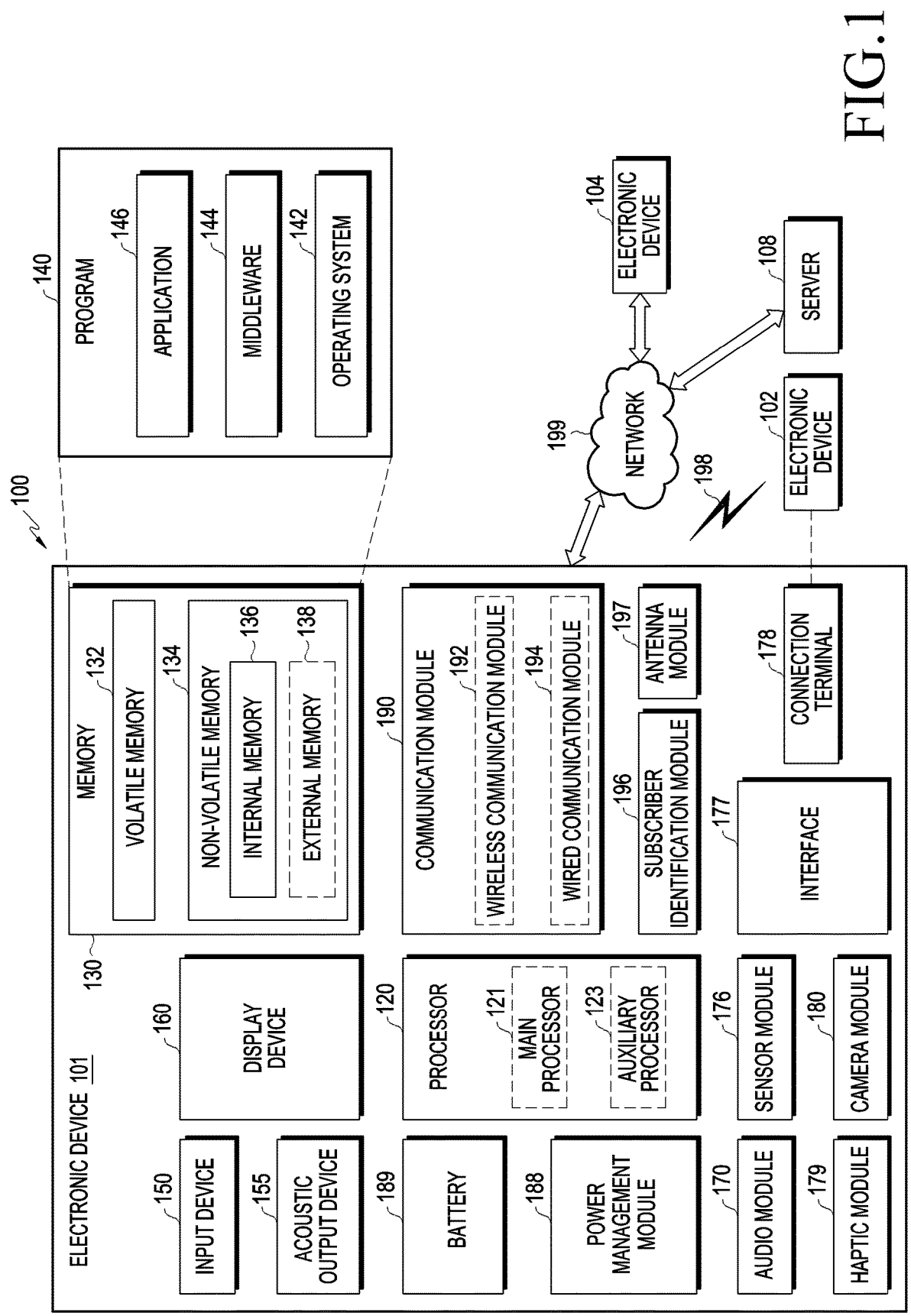
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by a component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and at least one antenna appropriate for a communication scheme used in the communication network, such as the first network 198 or the second network 199, may be selected, for example, by the communication module 190 from the one or more antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
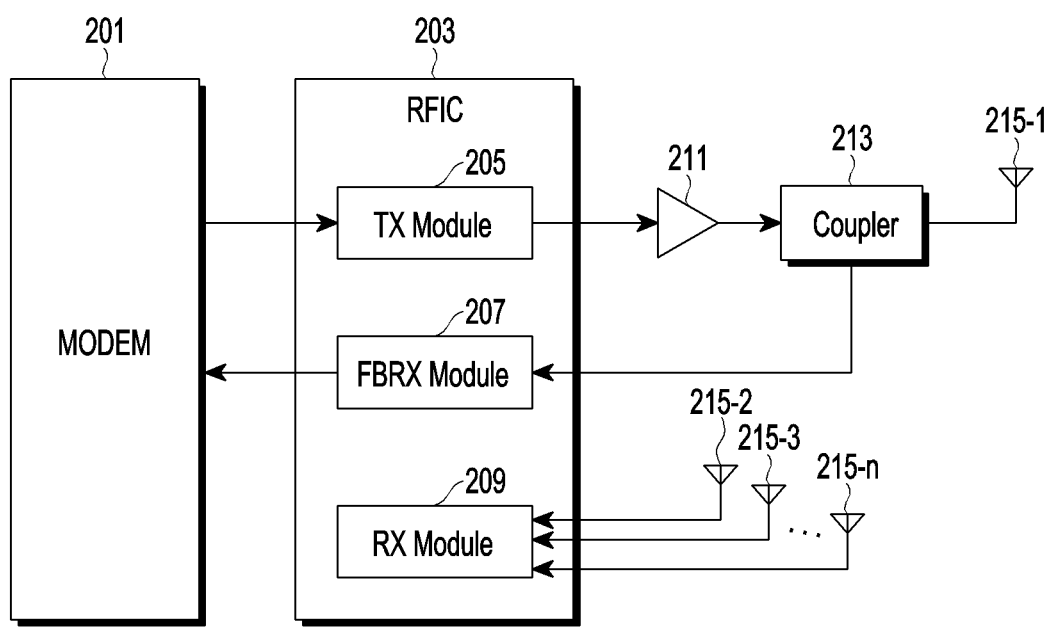
FIG. 2 is a block diagram illustrating a part of an electronic device according to various embodiments.

FIG. 2 is a block diagram illustrating a part of an electronic device according to various embodiments. According to one embodiment, an electronic device (for example, the electronic device 101 of FIG. 1) may include: a MODEM 201; a radio frequency IC (RFIC) 203 including a TX module 205, a feedback RX (FBRX) module 207, and an RX module 209; a power amplitude modulation or modulator (PAM) 211; a coupler 213; and multiple antennas 215-1, 215-2, 215-3, . . . , 215-n. According to various embodiments, the MODEM 201 and the RFIC 203 of FIG. 2 may be elements included in the communication module 190 of FIG. 1, and the PAM 211 and the multiple (for example, four) antennas 215-1 to 215-n of FIG. 2 may be elements included in the antenna module 197 of FIG. 1.

Referring to FIG. 2, the MODEM 201 may be connected to the TX module 205 and the RX module 209 of the RFIC 203. The MODEM 201 may transmit a signal to an external electronic device (for example, a base station) through the TX module 205 and the antenna 215-1. The MODEM 201 may generate a modulated signal by modulating an input baseband signal in a designated modulation method, and then output the modulated signal to the RFIC 203. The TX module 205 may generate a transmission signal, based on a modulated signal and a carrier signal, and then output the transmission signal to the PAM 211. In addition, if at least one reception signal is processed by and output from the RFIC 203, the MODEM 201 may demodulate a signal output from the RFIC 203 in a designated demodulation method, and thus identify a baseband signal. For example, the RX module 209 may include at least one of a low-power amplifier or mixer, and may amplify a received reception signal, or identify, from a reception signal, a signal to be demodulated and then output the identified signal to the MODEM 201.

According to various embodiments, the PAM 211 is connected to the TX module 205 so as to amplify transmission power of a signal. In addition, the MODEM 201 may receive a signal from an external electronic device (for example, a base station) through the RX module 209 and at least one antenna among the multiple antennas 215-2 to 215-n. In FIG. 2, it is illustrated that the TX module 205 is connected to a single antenna 211-1, but the disclosure is not limited thereto.

The electronic device 101 according to one embodiment may receive, through the coupler 213, a reflective wave of a signal transmitted from the TX module 205 by using the FBRX module 207. When a reflective wave of a transmission signal is received, the MODEM 201 may obtain a measurement value of the reflective wave. For example, as shown in FIGS. 3A and 3B, a measurement value of a reflective wave may be expressed as an I/Q value.

Figure 3A:
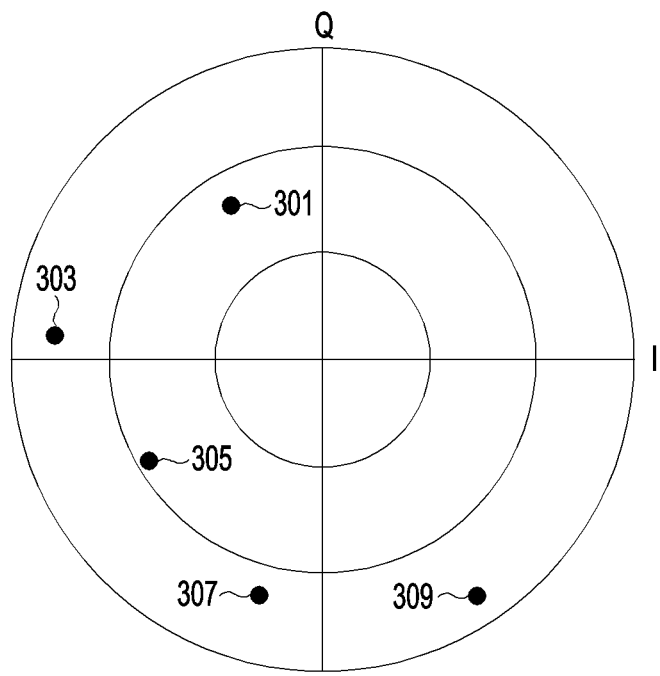
FIGS. 3A and 3B are drawings for describing a measurement value of a reflective wave according to various embodiments.
Figure 3B:
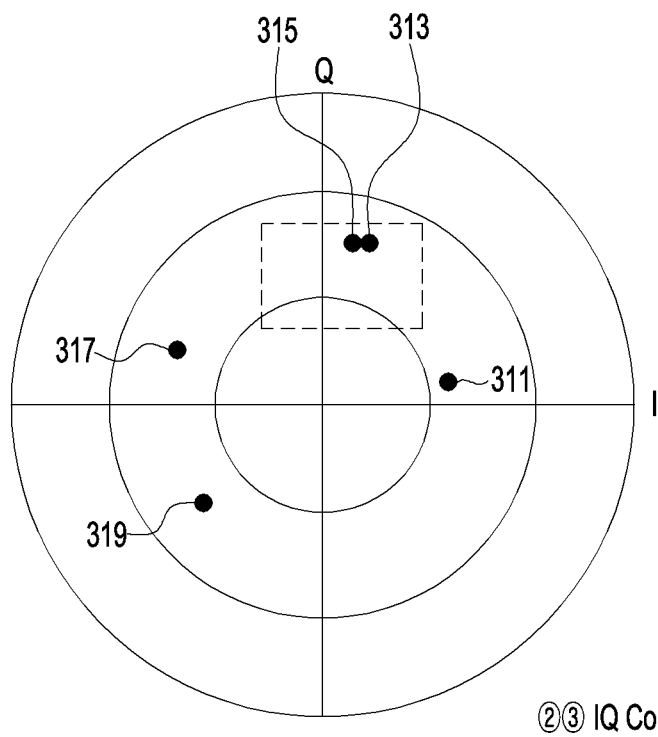

FIGS. 3A and 3B are drawings for describing a measurement value of a reflective wave according to various embodiments.

As shown in FIGS. 3A and 3B, a measurement value of a reflective wave may be expressed in an orthogonal coordinate system representing an amplitude and a phase of a reflective wave. For example, a length of a vector of a measurement value may indicate an amplitude of a reflective wave and an angle between the vector and the horizontal axis may indicate a phase of a reflective wave. An orthogonal coordinate system includes the horizontal axis "I" and the vertical axis "Q", and a measurement value may be obtained as an I/Q value in an orthogonal coordinate system.

In a state where an antenna is optimized by antenna tuning, a measurement value of a reflective wave may be (0, 0) or be close to (0, 0). For example, an electronic device 101 (for example, the electronic device 101 of FIG. 1) may obtain a first measurement value 301, a second measurement value 303, a third measurement value 305, a fourth measurement value 307, and a fifth measurement value 309, and the respective measurement values may be determined to have errors due to different events. In order to optimize an antenna, the electronic device 101 may perform fine tuning such that a measurement value of a reflective wave is close to the origin when the first measurement value 301 is obtained. The fine tuning may indicate to tune a coarse tuned value more minutely, such that a measurement value of a reflective wave of a transmission signal is close to the origin. For example, the first measurement value 301 may be experimentally identified in advance to have an error due to a user's antenna grip, and accordingly, when a measurement value of a reflective wave is identified to be the first measurement value 301, the electronic device 101 may adjust an antenna parameter for overcoming deterioration due to the user's antenna grip and the corresponding antenna parameter adjustment may be referred to as fine tuning. The electronic device 101 may store measurement values while associating the measurement values with fine tuning methods, respectively, and may perform a fine tuning method which is determined depending on a measurement value having been identified from a reflective wave.

In comparison with FIG. 3A, FIG. 3B illustrates a measurement value of a reflective wave of a signal that, according to one embodiment, the electronic device 101 has transmitted by using a high frequency band. The electronic device 101 may obtain a first measurement value 311, a second measurement value 313, a third measurement value 315, a fourth measurement value 317, and a fifth measurement value 319, and the respective measurement values may be determined to have errors due to different events. An event corresponding to the first measurement value 301 in FIG. 3A may be the same as an event corresponding to the first measurement value 311 in FIG. 3B. In addition, events corresponding to the second measurement value 303, the third measurement value 305, the fourth measurement value 307, and the fifth measurement value 309 in FIG. 3A may be the same as events corresponding to the second measurement value 313, the third measurement value 315, the fourth measurement value 317, and the fifth measurement value 319 in FIG. 3B, respectively. As shown in the comparison between FIGS. 3A and 3B, a change (delta) in an I/Q value may become small in a high frequency band. Accordingly, since the second measurement value 313 and the third measurement value 315 overlap each other, it may be difficult to distinguish between the second measurement value and the third measurement value. For example, when the electronic device 101 identifies a measurement value positioned between the second measurement value 313 and the third measurement value 315, it may be difficult to identify whether to perform fine tuning of the event corresponding to the second measurement value 313 or perform fine tuning of the event corresponding to the third measurement value 315. Hereinafter, a method of, according to various embodiments, performing fine tuning, based on a measurement value of a reflective wave, is described with reference to FIGS. 4 to 9.

Figure 4:
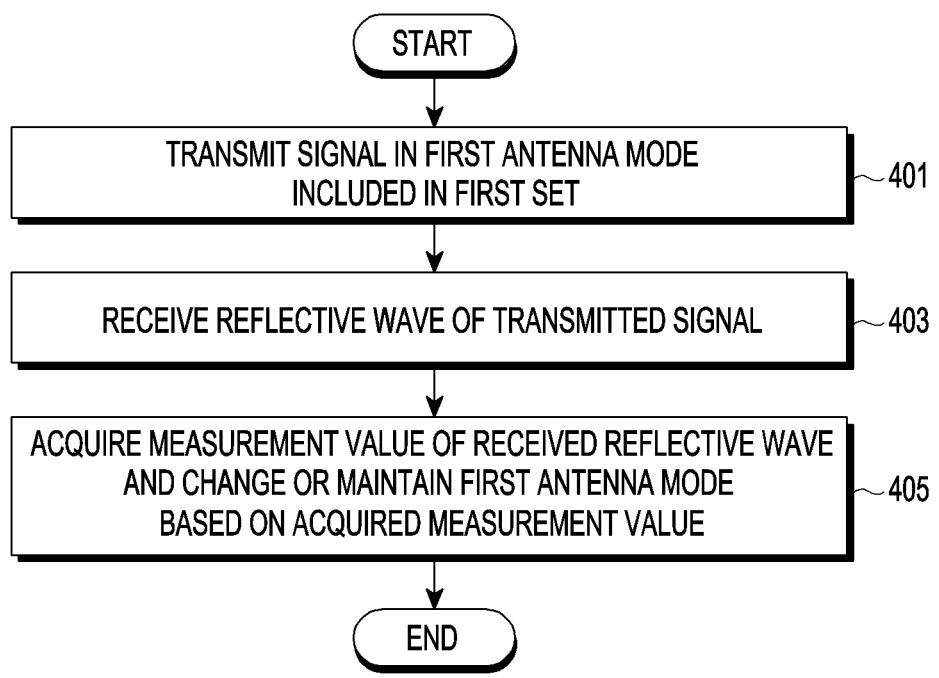
FIG. 4 is a flowchart illustrating an operation of identifying, by an electronic device according to various embodiments, an antenna mode.
Figure 5A:
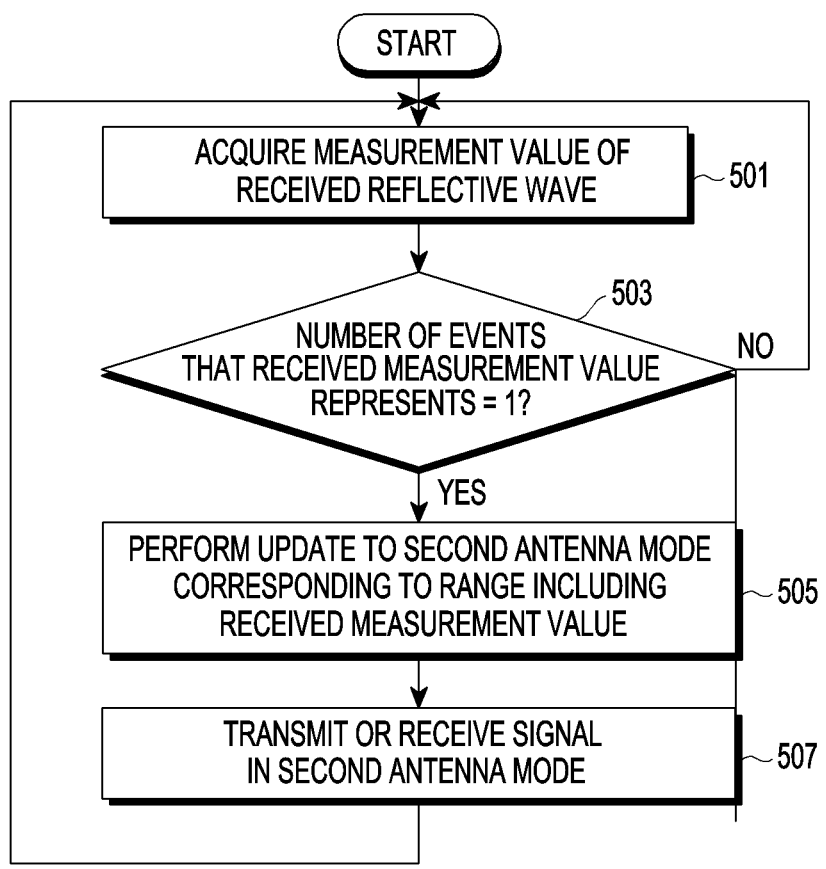
FIG. 5A is a flowchart illustrating an operation of identifying, by an electronic device according to various embodiments, an antenna mode.
Figure 5B:
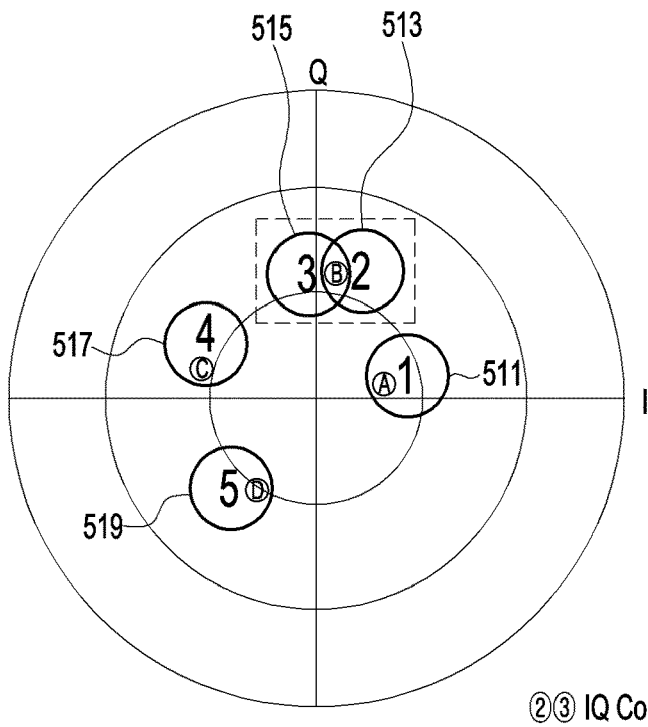
FIGS. 5B and 5C are drawings for describing an operation of identifying an antenna mode, based on a measurement value of a reflective wave according to various embodiments.
Figure 5C:
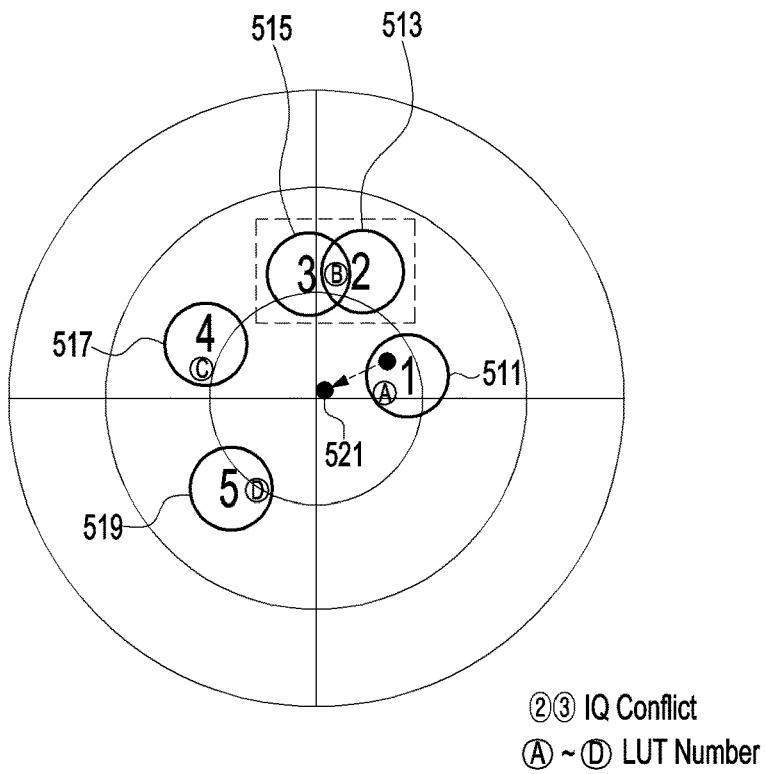

FIG. 4 is a flowchart illustrating an operation of identifying, by an electronic device according to various embodiments, an antenna mode. FIG. 5A is a flowchart illustrating an operation of identifying, by an electronic device according to various embodiments, an antenna mode. FIGS. 5B and 5C are drawings for describing an operation of identifying an antenna mode, based on a measurement value of a reflective wave according to various embodiments.

Referring to FIG. 4, according to various embodiments, in operation 401, the electronic device 101 (for example, the processor 120 of FIG. 1) may control at least one of a communication module or an antenna module so as to transmit a signal in a first antenna mode included in a first set. The electronic device 101 may include a lookup table including information on association between a plurality of antenna modes and events. As shown in Table 1 below, the plurality of antenna modes may correspond to antenna tune code. In Table 1 below, "free space" may indicate a normal state where an event does not occur, "USB" may indicate a USB connection state, "Earjack" may indicate an earjack connection state, "OTG gender" may indicate an OTG gender connection state, "Grip" may indicate a user's grip state, "CA active" may indicate whether or not carrier aggregation is activated, and "4R×D/MIMO" may indicate whether or not 4R×D/MIMO is activated. The antenna modes in Table 1 below are only examples for description and the disclosure is not limited thereto.

TABLE 1

|  | Antenna mode | Antenna tune code (hex) |
|---|---|---|
| Type of events | free space | 0x00000000 |
|  | USB (universal serial bus) | 0x00AA0000 |
|  | Earjack | 0x00BB0000 |
|  | OTG (on-the-go) gender | 0x00CC0000 |
|  | Grip | 0x00DD0000 |
|  | CA active | 0x00EE0000 |
|  | 4RxD/MIMO | 0x00FF0000 |
| LUT number | A | 0x00110000 |
|  | B | 0x00220000 |
|  | C | 0x00330000 |
|  | D | 0x00440000 |

For example, antenna modes included in a first set may be antenna modes (free space, USB, Earjack, OTG gender, Grip, CA active, and 4R×D/MIMO) associated with events which may be identified by a processor (for example, the processor 120). For example, antenna modes such as "USB", "Earjack", "OTG gender", and "Grip" may be identified by an application processor (AP). The antenna modes such as "CA active" and "4R×D/MIMO" may be identified by a communication processor (CP). For example, after network connection, if it is identified that USB is connected by a processor, the electronic device 101 may identify antenna mode "USB", based on a lookup table and tune an antenna by means of code 0x00AA0000. According to various embodiments, tuning an antenna such that the antenna corresponds to antenna modes (for example, the antenna modes included in the first set) associated with the events which may be identified by the processor may be referred to as coarse tuning.

According to various embodiments, the electronic device 101 may receive a reflective wave of the transmitted signal in operation 403. As described above, the electronic device 101 may acquire a reflective wave through a coupler connected to a transmission antenna.

According to various embodiments, in operation 405, the electronic device 101 may acquire a measurement value of the received reflective wave, and change or maintain the first antenna mode, based on the acquired measurement value. When the acquired measurement value is included within a designated range, the electronic device 101 may change the first antenna mode to a second antenna mode included in a second set. For example, antenna modes included in the second set may be antenna modes which may be identified by a measurement value of a reflective wave. When the acquired measurement value is not included within a designated range, the electronic device 101 may maintain the first antenna mode and thus transmit a signal in the first antenna mode.

FIG. 5A describes one embodiment of operation 405 of changing or maintaining the first antenna mode. According to various embodiments, in operation 501, the electronic device 101 may acquire a measurement value of the received reflective wave.

According to various embodiments, in operation 503, the electronic device 101 (for example, the electronic device 101 of FIG. 1) may determine whether the number of events that the received measurement value represents is one. For example, as shown in FIG. 5B, it may be assumed that range A indicates a first event 511, range B indicates at least one of a second event 513 and a third event 515, range C indicates a fourth event 517, and range D indicates a fifth event 519. When a measurement value is included within one range among range A, range C, and range D, the electronic device 101 may determine that the number of events that the received measurement value represents is one. For example, the designated range which is described in association with operation 405 of FIG. 4 may be at least one of range A, range C, and range D, and a range (for example, range B) capable of corresponding to two or more events may be not configured as a designated range. When a measurement value of a reflective wave is included within a designated range (for example, range A, range C, and range D), the electronic device 101 may further perform fine tuning corresponding to the corresponding range, and when a measurement value of a reflective wave is not included within a designated range (for example, range B), the electronic device may omit fine tuning or perform tuning which is difference from fine tuning. For example, fine tuning may indicate update of a tune code, which is performed by updating an antenna event to an event that a reflective wave IQ delta value represents. For example, tuning, which is different from fine tuning, may indicate update of a tune code, which is performed by updating an antenna event associated with events which may be identified by a processor.

According to various embodiments, if it is determined that the number of events that the measurement value represents is one (Yes), in operation 505, the electronic device 101 may perform an update to a second antenna mode corresponding to a range including the received measurement value. For example, in FIG. 5B, when the measurement value of the reflective wave is included within range A, the electronic device 101 may determine that the number of events that the measurement value represents is one (the first event 511), and may perform an update to a second antenna mode corresponding to range A including the measurement value. Referring to Table 1 above, the electronic device 101 may tune an antenna by means of code 0x00110000 which corresponds to range A.

According to various embodiments, if it is determined that the number of events that the measurement value represents is two or more (No), the electronic device 101 returns to operation 501 so as to maintain the first antenna mode and acquire a measurement value of the received reflective wave. For example, in FIG. 5B, when the measurement value of the reflective wave is included within range B, the electronic device 101 may determine that the number of events that the measurement value represents is two (the second event 513 and the third event 515), and maintain the first antenna mode.

According to various embodiments, in operation 507, the electronic device 101 may transmit or receive a signal in the second antenna mode. As shown in FIG. 5C, a measurement value of a reflective wave of a signal transmitted in the second antenna mode (for example, code 0x00110000) may be identified to be the origin 521. For example, if it is determined that the first event 511 has occurred, the electronic device 101 may optimize an antenna by applying antenna mode A corresponding to the first event.

Figure 6:
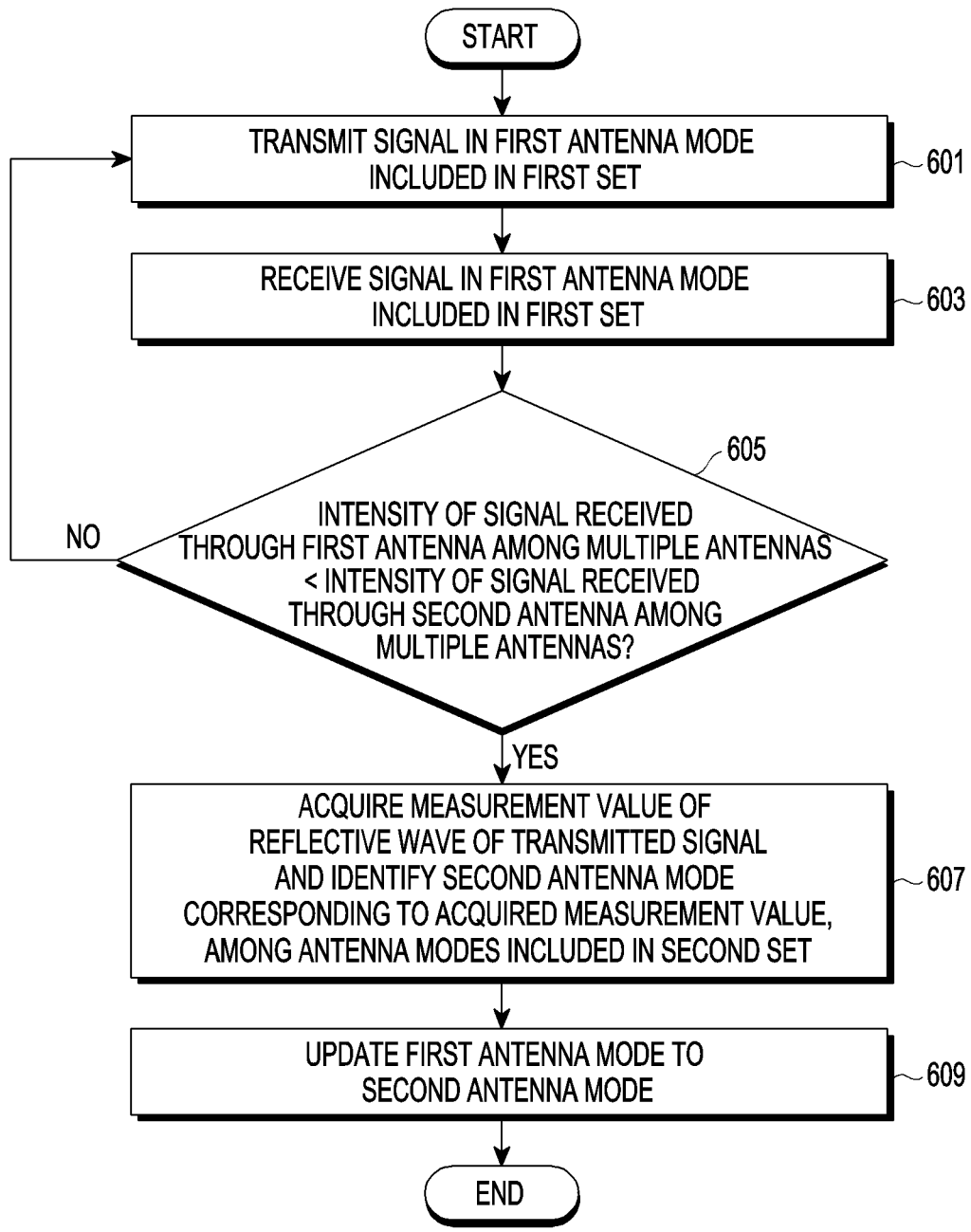
FIG. 6 is a flowchart illustrating an operation of identifying an antenna mode, based on an intensity of a reception signal according to various embodiments.

FIG. 6 is a flowchart illustrating an operation of identifying an antenna mode, based on an intensity of a reception signal according to various embodiments.

Referring to FIG. 6, according to various embodiments, in operation 601, the electronic device 101 (for example, the processor 120 of FIG. 1) may transmit a signal in a first antenna mode included in a first set. For example, the electronic device 101 may transmit a signal in a first antenna mode through coarse tuning.

According to various embodiments, in operation 603, the electronic device 101 may receive a signal in the first antenna mode included in the first set. For example, the electronic device 101 may receive a signal through multiple antennas (for example, the multiple antennas 215-2, 215-3, . . . , 215-n of FIG. 2).

According to various embodiments, in operation 605, the electronic device 101 may determine whether an intensity of a signal received through a first antenna among the multiple antennas is remarkably smaller than an intensity of a signal received through a second antenna among the multiple antennas. For example, the first antenna may be a main antenna, and the second antenna may be an auxiliary antenna. When an intensity of a signal received through the first antenna is smaller than a designated ratio (for example, 20%) of a signal received through the second antenna, the electronic device 101 may determine that the intensity of the signal received through the first antenna is remarkably smaller than the intensity of the signal received through the second antenna. In addition, when a value obtained by subtracting the intensity of the signal received through the first antenna from the intensity of the signal received through the second antenna is greater than a designated value, the electronic device 101 may determine that the intensity of the signal received through the first antenna is remarkably smaller than the intensity of the signal received through the second antenna.

According to various embodiments, if it is determined that the intensity of the signal received through the first antenna is remarkably smaller than the intensity of the signal received through the second antenna (Yes), in operation 607, the electronic device 101 may acquire a measurement value of a reflective wave of the transmitted signal and thus identify a second antenna mode corresponding to the acquired measurement value among antenna modes included in a second set. For example, the fact that the intensity of the signal received through the first antenna is remarkably smaller than the intensity of the signal received through the second antenna may indicate a fact that antenna tuning for optimizing an antenna is required due to occurrence of an event.

According to various embodiments, if it is not determined that the intensity of the signal received through the first antenna is remarkably smaller than the intensity of the signal received through the second antenna (No), the electronic device 101 returns to operation 601 so as to transmit a signal while maintaining the first antenna mode.

According to various embodiments, in operation 609, the electronic device 101 may update the first antenna mode to the identified second antenna mode. Accordingly, fine tuning is performed only when the intensity of the signal received through the first antenna is remarkably smaller than the intensity of the signal received through the second antenna, and this way may be more efficient than a way of performing fine tuning all the time.

Figure 7:
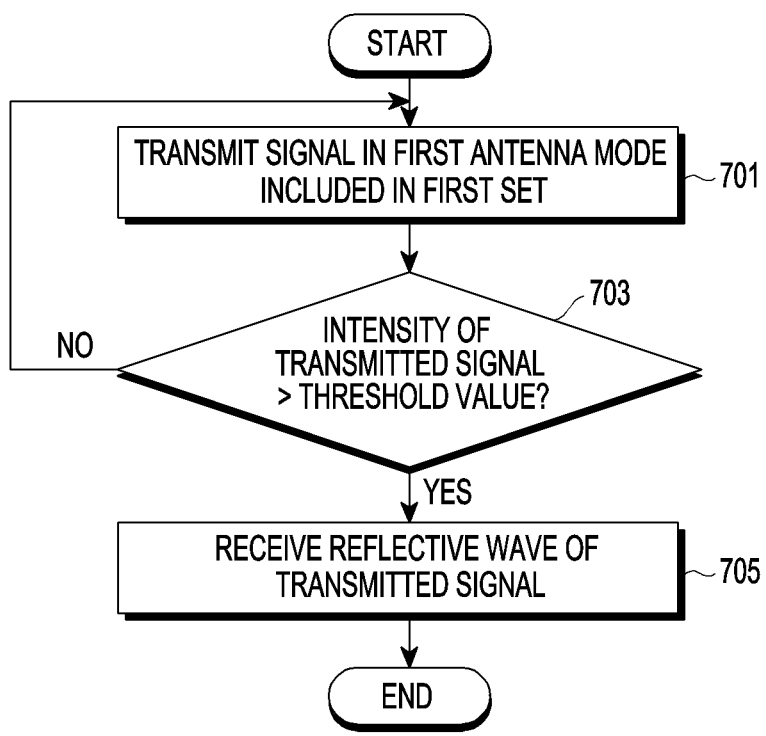
FIG. 7 is a flowchart illustrating a method of receiving a reflective wave according to various embodiments.

FIG. 7 is a flowchart illustrating a method of receiving a reflective wave according to various embodiments.

According to various embodiments, in operation 701, the electronic device 101 (for example, the processor 120 of FIG. 1) may transmit a signal in a first antenna mode included in a first set. For example, the electronic device 101 may transmit a signal in the first antenna mode through coarse tuning.

According to various embodiments, in operation 703, the electronic device 101 may determine whether an intensity of the transmitted signal exceeds a threshold value. For example, the threshold value may be an intensity of a transmission signal that may receive a reflective wave.

According to various embodiments, if it is determined that an intensity of the transmitted signal exceeds a threshold value (Yes), in operation 705, the electronic device 101 may receive a reflective wave of the transmitted signal.

According to various embodiments, if it is determined that an intensity of the transmitted signal is equal to or smaller than a threshold value (No), the electronic device 101 returns to operation 701 so as to transmit a signal in the first antenna mode.

Figure 8:
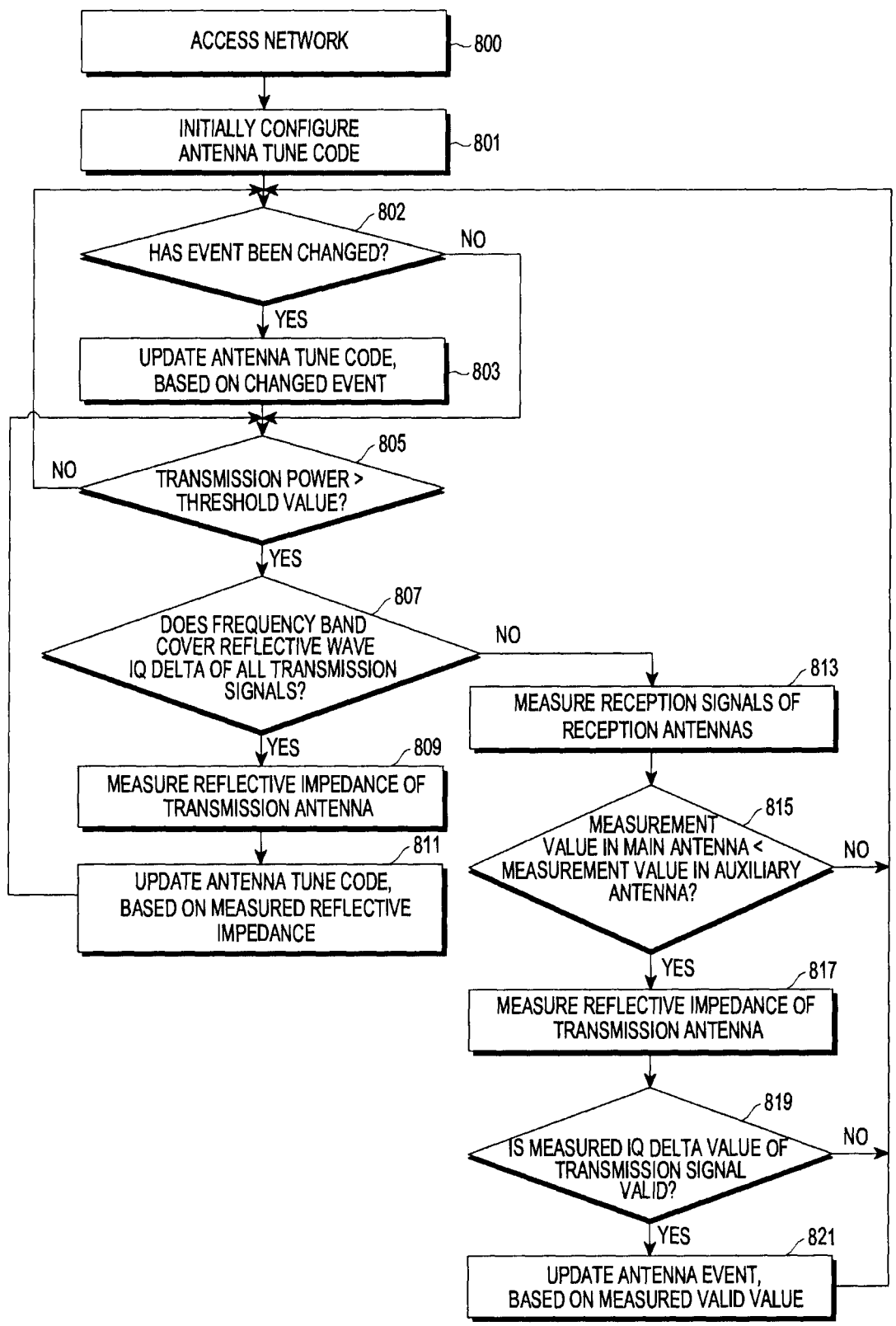
FIG. 8 is a flowchart illustrating an operation of identifying an antenna mode according to various embodiments.

FIG. 8 is a flowchart illustrating an operation of identifying an antenna mode according to various embodiments.

According to various embodiments, in operation 800, the electronic device 101 (for example, the processor 120 of FIG. 1) may be connected to a network.

According to various embodiments, in operation 801, the electronic device 101 may initially configure an antenna tune code.

According to various embodiments, in operation 802, the electronic device 101 may determine whether an event has been changed. For example, the fact that an event has been changed may indicate a fact that a new event is identified by the processor 120 or an event is identified by means of measurement of a reflective wave.

According to various embodiments, in operation 803, the electronic device 101 may update an antenna tune code, based on the event. For example, the electronic device 101 may update a tune code to an antenna mode corresponding to the event having been identified by the processor. This update may be the coarse tuning described above.

According to various embodiments, in operation 805, the electronic device 101 may determine whether transmission power exceeds a threshold value. For example, the fact that transmission power exceeds a threshold value may indicate a fact that a reflective wave can be received.

According to various embodiments, if transmission power does not exceed a threshold value (No), the electronic device 101 returns to operation 802 so as to determine whether an event has been changed.

According to various embodiments, if transmission power exceeds a threshold value (Yes), in operation 807, the electronic device 101 may determine whether a frequency band covers reflective wave IQ delta of all transmission signals. For example, the IQ delta may indicate a value obtained in an orthogonal coordinate system which includes the horizontal axis "I" and the vertical axis "Q" and represents an amplitude and a phase of a reflective wave. For example, the fact that a frequency band covers reflective wave IQ delta of all transmission signals may indicate a fact that all ranges including reflective wave IQ delta values of all transmission signals do not overlap each other, and a low frequency band may mainly cover reflective wave IQ delta of all transmission signals.

According to various embodiments, if it is determined that a frequency band covers reflective wave IQ delta of all transmission signals (Yes), in operation 809, the electronic device 101 may measure a reflective impedance of a transmission antenna.

According to various embodiments, in operation 811, the electronic device 101 may update an antenna tune code, based on the measured reflective impedance. The electronic device 101 may transmit a signal by tuning an antenna by means of the updated tune code.

According to various embodiments, if it is determined that a frequency band cannot cover reflective wave IQ delta of all transmission signals (No), in operation 813, the electronic device 101 may measure reception signals of reception antennas. For example, the fact that a frequency band cannot cover reflective wave IQ delta of all transmission signals may indicate a fact that at least two ranges among ranges including reflective wave IQ delta values of all transmission signals overlap each other.

According to various embodiments, in operation 815, the electronic device 101 may determine whether a measurement value in a main antenna is remarkably smaller than a measurement value in an auxiliary antenna. For example, the fact that a measurement value of a reception signal in a main antenna is remarkably smaller than a measurement value of a reception signal in an auxiliary antenna may indicate a state where the main antenna is required to be optimized.

According to various embodiments, if it is determined that a measurement value in a main antenna is remarkably smaller than a measurement value in an auxiliary antenna, in operation 817, the electronic device 101 may measure a reflective impedance of a transmission antenna.

According to various embodiments, in operation 819, the electronic device 101 may determine whether a measured reflective wave IQ delta value of a transmission signal is valid.

For example, the fact that a measured reflective wave IQ delta value of a transmission signal is valid may indicate a fact that the number of events that the reflective wave IQ delta value represents is one.

According to various embodiments, if it is determined that a measured reflective wave IQ delta value of a transmission signal is valid, in operation 821, the electronic device 101 may update an antenna event, based on the measured valid value. For example, the electronic device 101 may update an antenna event to an event that the reflective wave IQ delta value represents and thus update a tune code. This update may be the fine tuning described above.

According to various embodiments, if it is determined that a measured reflective wave IQ delta value of a transmission signal is invalid, the electronic device 101 may not perform an antenna update. For example, the fact that a reflective wave IQ delta value is invalid may indicate a fact that the number of events that the reflective wave IQ delta value represents is one or more, and when the events overlap each other, an event that is a cause of the reflective wave IQ delta value may not be distinguished, so that an event update may not be performed. A range including an invalid reflective wave IQ delta value may be stored in the electronic device 101, and the electronic device 101 may determine that a reflective wave IQ delta value is invalid, by using the stored range including an invalid reflective wave IQ delta value. As shown in FIG. 5B, if the reflective wave IQ delta value is included within range B, it may not be identified whether an event that is a cause of the reflective wave IQ delta value is the second event 513 or the third event 515. For example, the event that is a cause of the reflective wave IQ delta value is the second event 513, but when an antenna is tuned by means of a tune code corresponding to the third event 515, performance of the antenna may become worse, and thus, when the number of events that the reflective wave IQ delta value represents is two or more, the electronic device 101 may not perform an event update.

Figure 9:
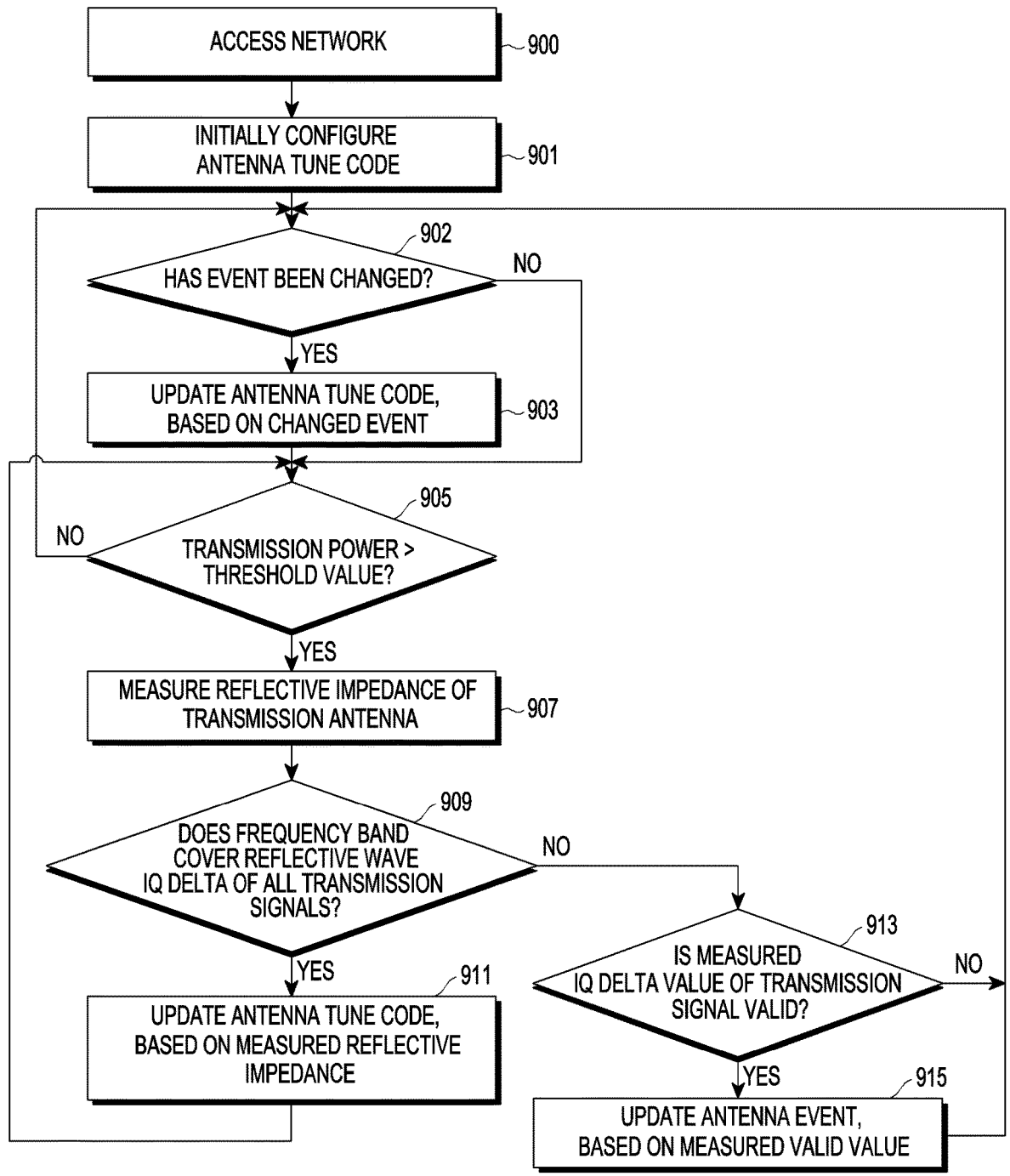
FIG. 9 is a flowchart illustrating an operation of identifying an antenna mode according to various embodiments.

FIG. 9 is a flowchart illustrating an operation of identifying an antenna mode according to various embodiments.

According to various embodiments, in operation 900, the electronic device 101 (for example, the processor 120 of FIG. 1) may be connected to a network.

According to various embodiments, in operation 901, the electronic device 101 may initially configure an antenna tune code.

According to various embodiments, in operation 902, the electronic device 101 may determine whether an event has been changed. For example, the fact that an event has been changed may indicate a fact that a new event is identified by the processor 120 or an event is identified by means of measurement of a reflective wave.

According to various embodiments, in operation 903, the electronic device 101 may update an antenna tune code, based on the event. Operation 903 is the same as operation 803 of FIG. 8, and the specific description thereof is thus omitted.

According to various embodiments, in operation 905, the electronic device 101 may determine whether transmission power exceeds a threshold value. Operation 905 is the same as operation 805 of FIG. 8, and the specific description thereof is thus omitted.

According to various embodiments, if transmission power does not exceed a threshold value (No), the electronic device 101 returns to operation 902 so as to determine whether an event has been changed.

According to various embodiments, if transmission power exceeds a threshold value (Yes), in operation 907, the electronic device 101 may measure a reflective impedance of a transmission antenna.

According to various embodiments, in operation 909, the electronic device 101 may determine whether a frequency band covers reflective wave IQ delta of all transmission signals. For example, the fact that a frequency band cannot cover reflective wave IQ delta of all transmission signals may indicate a fact that at least two ranges among ranges including reflective wave IQ delta values of all transmission signals overlap each other.

According to various embodiments, if it is determined that a frequency band covers reflective wave IQ delta of all transmission signals (Yes), in operation 911, the electronic device 101 may update an antenna tune code, based on the measured reflective impedance. The electronic device 101 may transmit a signal by tuning an antenna by means of the updated tune code.

According to various embodiments, if it is determined that a frequency band cannot cover reflective wave IQ delta of all transmission signals (No), in operation 913, the electronic device 101 may determine whether a measured reflective wave IQ delta value of a transmission signal is valid. For example, the fact that a measured reflective wave IQ delta value of a transmission signal is valid may indicate a fact that the number of events that the reflective wave IQ delta value represents is one.

According to various embodiments, if it is determined that a measured reflective wave IQ delta value of a transmission signal is valid (Yes), in operation 915, the electronic device 101 may update an antenna event, based on the measured valid value. Operation 915 is the same as operation 821 of FIG. 8, and the specific description thereof is thus omitted.

According to various embodiments, if it is determined that a measured reflective wave IQ delta value of a transmission signal is invalid (No), the electronic device 101 may not perform an antenna update (for example, fine tuning) using a reflective wave IQ delta value. In addition, the electronic device 101 returns to operation 902 so as to determine whether an event has been changed. For example, when a measured reflective wave IQ delta value of a transmission signal is invalid, the electronic device 101 may not perform fine tuning and perform coarse tuning in accordance with whether an event has been changed.

The embodiment of FIG. 9 is an embodiment obtained by excluding, from the embodiment of FIG. 8, the configuration of measuring reception signals of reception antennas and measuring a reflective impedance of a transmission antenna only when a measurement value in a main antenna is remarkably smaller than a measurement value in an auxiliary antenna. In the embodiment of FIG. 9, as the configuration is excluded, fine tuning can be performed all the time.

According to various embodiments, an electronic device (for example, the electronic device 101 of FIG. 1) may include: a housing; a wireless communication circuit (for example, the communication module 190 of FIG. 1) positioned inside the housing so as to transmit or receive at least one RF signal; multiple antennas (for example, the antenna 211 of FIG. 2) positioned inside the housing or configured as parts of the housing, and electrically connected to the wireless communication circuit; at least one processor (for example, the processor 120 of FIG. 1) operatively connected to the wireless communication circuit (For example, the communication module 190); and a memory (for example, the memory 130 of FIG. 1) operatively connected to the at least one processor (for example, the processor 120). The memory (for example, the memory 130) may store a lookup table including a first set of antenna modes regarding at least some of the multiple antennas and a second set of antenna modes regarding at least some of the multiple antennas. In addition, the memory may store instructions that, when executed, cause the processor (for example, the processor 120) to: cause the wireless communication circuit (for example, the communication module 190) to transmit a signal in a first antenna mode included in the first set; cause the wireless communication circuit (for example, the communication module 190) to receive a reflective wave of the transmitted signal; acquire a measurement value of the received reflective wave so as to identify whether or not the measurement value is included within at least one designated range; identify a second antenna mode corresponding to the acquired measurement value, among the antenna modes included in the second set, if it is identified that the measurement value is included within at least one designated range; and cause the wireless communication circuit (for example, the communication module 190) to transmit the signal in the second antenna mode.

According to various embodiments, the instructions may cause the processor (for example, the processor 120) to maintain the signal transmission in the first antenna mode if it is identified that the measurement value is not included within at least one designated range.

According to various embodiments, the at least one designated range may be configured to be a range in which the number of events that a measurement value included within the at least one designated range represents is identified to be one.

According to various embodiments, a measurement value which is identified to represent two or more events may not be included within the at least one designated range.

According to various embodiments, the instructions may cause the processor (for example, the processor 120) to, as a part of the operation of acquiring a measurement value of the received reflective wave and then identifying whether or not the measurement value is included within at least one designated range: identify a ratio between an intensity of a signal received through a first antenna among the multiple antennas and an intensity of a signal received through a second antenna among the multiple antennas; and acquire a measurement value of the received reflective wave when the identified ratio is equal to or lower than a designated value.

According to various embodiments, the instructions may cause the processor (for example, the processor 120) to, as a part of the operation of acquiring a measurement value of the received reflective wave and then identifying whether or not the measurement value is included within at least one designated range: identify a difference between an intensity of a signal received through a first antenna among the multiple antennas and an intensity of a signal received through a second antenna among the multiple antennas; and acquire a measurement value of the received reflective wave when the identified difference is equal to or higher than a designated value.

According to various embodiments, the lookup table may include: first association information between multiple antenna modes included in the first set and events which may be identified by the at least one processor (for example, the processor 120); and second association information between multiple antenna modes included in the second set and multiple ranges regarding the measurement value of the reflective wave.

According to various embodiments, the events which may be identified by the at least one processor (for example, the processor 120) may include at least one event among a free space event, a universal serial bus (USB) connection event, an earjack connection event, a carrier aggregation (CA) activation event, a hand grip event, a 4-way receive diversity (4RxD) mode activation event, or a multiple input multiple output (MIMO) mode activation event.

According to various embodiments, the multiple ranges regarding the measurement value of the reflective wave may be expressed as an I/Q value range, and the I/Q value range may include at least one I/Q value range among a range of an I/Q value corresponding to a free space event, a range of an I/Q value corresponding to a USB connection event, a range of an I/Q value corresponding to an earjack connection event, a range of an I/Q value corresponding to a CA activation event, a range of an I/Q value corresponding to a hand grip event, a range of an I/Q value corresponding to a 4RxD mode activation event, or a range of an I/Q value corresponding to an MIMO mode activation event.

According to various embodiments, the instructions may cause the processor (for example, the processor 120) to, as a part of the operation of causing the wireless communication circuit (for example, the communication module 190) to receive a reflective wave of the transmitted signal, receive a reflective wave of the transmitted signal when an intensity of a signal transmitted in the first antenna mode is equal to or higher than a threshold value.

According to various embodiments, the wireless communication circuit (for example, the communication module 190) may transmit or receive the at least one RF signal by using a band of 6 GHz or lower (Sub 6).

According to various embodiments, an electronic device may include: a housing; a wireless communication circuit (for example, the communication module 190) positioned inside the housing so as to transmit or receive at least one RF signal; multiple antennas positioned inside the housing or configured as parts of the housing, and electrically connected to the wireless communication circuit (for example, the communication module 190); at least one processor (for example, the processor 120) operatively connected to the wireless communication circuit (for example, the communication module 190); and a memory (for example, the memory 130) operatively connected to the at least one processor (for example, the processor 120). The memory (for example, the memory 130) may store instructions that, when executed, cause the processor (for example, the processor 120) to: cause the wireless communication circuit (for example, the communication module 190) to transmit a signal in a first antenna mode; cause the wireless communication circuit (for example, the communication module 190) to receive a reflective wave of the transmitted signal; acquire a measurement value of the received reflective wave; and change or maintain the first antenna mode, based on the acquired measurement value.

According to various embodiments, the instructions may cause the processor (for example, the processor 120) to, as a part of the operation of acquiring a measurement value of the received reflective wave and then changing or maintaining the first antenna mode, based on the acquired measurement value: acquire a measurement value of the received reflective wave; identify whether or not the acquired measurement value is included within at least one designated range; and change the first antenna mode to a second antenna mode when it is identified that the acquired measurement value is included within at least one designated range.

According to various embodiments, the at least one designated range may be configured to be a range in which the number of events that a measurement value included within the at least one designated range represents is identified to be one.

According to various embodiments, the first antenna mode may correspond to an event which may be identified by the at least one processor (for example, the processor 120), and the second antenna mode may correspond to an event which may be identified by a range regarding the measurement value of the reflective wave.

According to various embodiments, the instructions may cause the processor (for example, the processor 120) to, as a part of the operation of acquiring a measurement value of the received reflective wave and then changing or maintaining the first antenna mode, based on the acquired measurement value: acquire a measurement value of the received reflective wave; and maintain the first antenna mode when it is identified that the acquired measurement value is not included within at least one designated range.

According to various embodiments, a measurement value which is identified to represent two or more events may not be included within the at least one designated range.

According to various embodiments, the instructions may cause the processor (for example, the processor 120) to: identify a ratio between an intensity of a signal received through a first antenna among the multiple antennas and an intensity of a signal received through a second antenna among the multiple antennas; and identify a measurement value of the received reflective wave when the identified ratio is equal to or lower than a designated value.

According to various embodiments, the instructions may cause the processor (for example, the processor 120) to: identify a difference between an intensity of a signal received through a first antenna among the multiple antennas and an intensity of a signal received through a second antenna among the multiple antennas; and identify a measurement value of the received reflective wave when the identified difference is equal to or higher than a designated value.

According to various embodiments, the electronic device 101 may include: a housing; a wireless communication circuit (for example, the communication module 190) positioned inside the housing so as to transmit or receive at least one RF signal; multiple antennas positioned inside the housing or configured as parts of the housing, and electrically connected to the wireless communication circuit (for example, the communication module 190); at least one processor (for example, the processor 120) operatively connected to the wireless communication circuit (for example, the communication module 190); and a memory (for example, the memory 130) operatively connected to the at least one processor (for example, the processor 120). The memory (for example, the memory 130) may store a lookup table including a first set of antenna modes regarding at least some of the multiple antennas and a second set of antenna modes regarding at least some of the multiple antennas. In addition, the memory may store instructions that, when executed, cause the processor (for example, the processor 120) to: cause the wireless communication circuit (for example, the communication module 190) to transmit a signal in a first antenna mode included in the first set; identify whether or not an intensity of a signal received through a first antenna among the multiple antennas and an intensity of a signal received through a second antenna among the multiple antennas satisfy a designated condition; cause the wireless communication circuit (for example, the communication module 190) to receive a reflective wave of the transmitted signal, if it is identified that the intensities satisfy the designated condition; acquire a measurement value of the received reflective wave so as to identify whether or not the measurement value is included within at least one designated range; identify a second antenna mode corresponding to the acquired measurement value among the antenna modes included in the second set, if it is identified that the measurement value is included within at least one designated range; and cause the wireless communication circuit (for example, the communication module 190) to transmit the signal in the second antenna mode.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
   a housing;
   a wireless communication circuit positioned inside the housing and configured to transmit or receive at least one radio frequency (RF) signal;
   multiple antennas positioned inside the housing or configured as parts of the housing, and electrically connected to the wireless communication circuit;
   at least one processor operatively connected to the wireless communication circuit; and
   a memory operatively connected to the at least one processor,
   wherein the memory is configured to store:
   a lookup table comprising a first set of antenna modes regarding at least some of the multiple antennas and a second set of antenna modes regarding at least some of the multiple antennas; and
   instructions that, when executed, cause the at least one processor to:
   cause the wireless communication circuit to transmit a signal in a first antenna mode included in the first set;
   cause the wireless communication circuit to receive a reflective wave of the transmitted signal;
   acquire a measurement value of the received reflective wave so as to identify whether the measurement value is included within at least one designated range;
   identify a second antenna mode corresponding to the acquired measurement value among the antenna modes included in the second set, in case that it is identified that the measurement value is included within the at least one designated range; and
   cause the wireless communication circuit to transmit the signal in the second antenna mode.

2. The electronic device of claim 1, wherein the instructions are configured to cause the at least one processor to keep transmitting the signal in the first antenna mode, in case that it is identified that the measurement value is not included within the at least one designated range.

3. The electronic device of claim 1, wherein the at least one designated range is configured to be a range in which a number of events that the measurement value included within the at least one designated range represents is identified to be one.

4. The electronic device of claim 1, wherein a measurement value which is identified to represent two or more events is not included within the at least one designated range.

5. The electronic device of claim 1, wherein the instructions are configured to cause the at least one processor to, as a part of the acquiring of the measurement value of the received reflective wave and the identifying of whether the measurement value is included within the at least one designated range:
    identify a ratio between an intensity of a signal received through a first antenna among the multiple antennas and an intensity of a signal received through a second antenna among the multiple antennas; and
    acquire the measurement value of the received reflective wave in case that the identified ratio is equal to or lower than a designated value.

6. The electronic device of claim 1, wherein the instructions are configured to cause the at least one processor to, as a part of the acquiring of the measurement value of the received reflective wave and the identifying of whether the measurement value is included within the at least one designated range:
    identify a difference between an intensity of a signal received through a first antenna among the multiple antennas and an intensity of a signal received through a second antenna among the multiple antennas; and
    acquire the measurement value of the received reflective wave in case that the identified difference is equal to or higher than a designated value.

7. The electronic device of claim 1, wherein the lookup table comprises:
    first association information between multiple antenna modes included in the first set and events which may be identified by the at least one processor; and
    second association information between the multiple antenna modes included in the second set and multiple ranges regarding the measurement value of the reflective wave.

8. The electronic device of claim 7, wherein the events which may be identified by the at least one processor comprise at least one event among a free space event, a universal serial bus (USB) connection event, an earjack connection event, a carrier aggregation (CA) activation event, a hand grip event, a 4-way receive diversity (4RxD) mode activation event, or a multiple input multiple output (MIMO) mode activation event.

9. The electronic device of claim 7, wherein the multiple ranges regarding the measurement value of the reflective wave are expressed as an I/Q value range, and the I/Q value range comprises at least one I/Q value range among a range of an I/Q value corresponding to a free space event, a range of an I/Q value corresponding to a USB connection event, a range of an I/Q value corresponding to an earjack connection event, a range of an I/Q value corresponding to a CA activation event, a range of an I/Q value corresponding to a hand grip event, a range of an I/Q value corresponding to a 4RxD mode activation event, or a range of an I/Q value corresponding to an MIMO mode activation event.

10. The electronic device of claim 1, wherein the instructions are configured to cause the at least one processor to, as a part of the causing of the wireless communication circuit to receive the reflective wave of the transmitted signal, receive the reflective wave of the transmitted signal in case that an intensity of the signal transmitted in the first antenna mode is equal to or higher than a threshold value.

11. The electronic device of claim 1, wherein the wireless communication circuit is configured to transmit or receive the at least one RF signal by using a band of 6 GHz or lower.

12. An electronic device comprising:
    a housing;
    a wireless communication circuit positioned inside the housing and configured to transmit or receive at least one RF signal;
    multiple antennas positioned inside the housing or configured as parts of the housing, and electrically connected to the wireless communication circuit;
    at least one processor operatively connected to the wireless communication circuit; and
    a memory operatively connected to the at least one processor,
    wherein the memory is configured to store instructions that, when executed, cause the at least one processor to:
    cause the wireless communication circuit to transmit a signal in a first antenna mode;
    cause the wireless communication circuit to receive a reflective wave of the transmitted signal;
    acquire a measurement value of the received reflective wave; and
    change or maintain the first antenna mode, based on the acquired measurement value, and
    wherein for acquiring the measurement value of the received reflective wave, and changing or maintaining the first antenna mode, based on the acquired measurement value, the instructions are configured to cause the at least one processor to:
    acquire the measurement value of the received reflective wave so as to identify whether the acquired measurement value is included within at least one designated range; and
    change the first antenna mode to a second antenna mode, in case that it is identified that the acquired measurement value is included within the at least one designated range.

13. The electronic device of claim 12, wherein the at least one designated range is configured to be a range in which a number of events that the measurement value included within the at least one designated range represents is identified to be one.

14. The electronic device of claim 12, wherein the first antenna mode corresponds to an event which may be identified by the at least one processor, and
    the second antenna mode corresponds to an event which may be identified by a range regarding the measurement value of the reflective wave.

* * * * *